Figure 1:
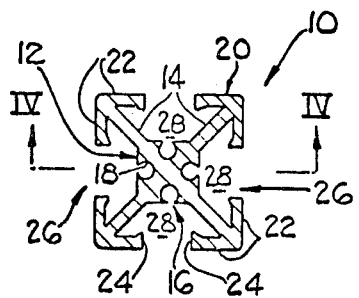

United States Patent [19]

Worrallo

[11] 4,146,343
[45] Mar. 27, 1979

[54] STRUCTURES FOR SHELVING AND PARTITIONING

[76] Inventor: Anthony C. Worrallo, 15, Sprott Rd., Kohimarama, Auckland, 5, New Zealand

[21] Appl. No.: 802,872

[22] Filed: Jun. 2, 1977

[30] Foreign Application Priority Data

Jun. 9, 1976 [NZ] New Zealand .......... 181101

[51] Int. Cl.² ............................................. F16B 12/10
[52] U.S. Cl. .................................. 403/264; 403/405; 403/407
[58] Field of Search .............. 403/403, 405, 406, 407, 403/408, 187, 346, 296, 255, 264; 52/285, 665, 718; 211/1 05.1

[56] References Cited

U.S. PATENT DOCUMENTS

| 3,451,183 | 6/1969 | Lespagnol et al. | 403/230 X |
| 3,612,585 | 10/1971 | Mayr | 403/264 |
| 3,901,612 | 8/1975 | Canin | 403/264 |
| 3,908,330 | 9/1975 | Frach et al. | 403/408 |
| 3,945,742 | 3/1976 | Condevaux | 403/255 |
| 3,962,774 | 6/1976 | Noro | 403/264 |
| 3,999,878 | 12/1976 | Robinson | 403/407 |
| 4,017,199 | 4/1977 | Strassle | 403/264 |

FOREIGN PATENT DOCUMENTS

| 2233314 | 1/1973 | Fed. Rep. of Germany | 403/406 |
| 2293167 | 7/1976 | France | 403/264 |

*Primary Examiner*—Mervin Stein
*Attorney, Agent, or Firm*—Roylance, Abrams, Berdo & Farley

[57] ABSTRACT

A unitary element is T-shaped with the crossbar of the T being a head and the upright of the T being a cylindrical collar. A bore passes through the collar and head and may receive a screw therein. A further portion protrudes from an end of the collar remote from the head and has a longitudinally extending planar face which intersects a transversely extending end face of the collar. The further portion longitudinal face and the collar end face engage a longitudinal face and a transverse face of a member, respectively, to fix the element on the member so that it will not rotate relative thereto. A corner member is provided for bracing two structural members which are linked together.

8 Claims, 12 Drawing Figures

STRUCTURES FOR SHELVING AND PARTITIONING

This invention relates generally to frameworks such as are used in shelving, partitioning etc.

According to one aspect of the present invention there is provided an element for releasably fastening two members together, the element being T-shaped and comprising a head constituting the cross-bar of the "T" and a collar forming the upright of the "T", there being a bore passing through the collar and the head, and the collar comprising a cylindrical portion adjacent to and merging with the head and a further portion protruding from the cylindrical portion on the side thereof remote from the head, the further portion having a longitudinally extending face which intersects a transversely extending end face of said cylindrical portion.

Preferably said faces intersect at right angles to one another and said longitudinally extending face lies in a plane parallel to the direction in which the head is elongated.

According to a further aspect of the present invention there is provided a structure comprising an element as described above, a screw and a structural member having a longitudinal face with a longitudinally extending re-entrant groove therein and a transverse face intersecting said longitudinal face, said element being positioned with its transversely extending face in engagement with the transverse face of said member, its longitudinally extending face in engagement with the longitudinal face of said member and the axis of its bore aligned with the longitudinal axis of said re-entrant groove, said screw passing through said head and said cylindrical portion and into said re-entrant groove to secure said element to said member.

It is preferred that the circumferential extent of said part cylindrical groove in said further portion and the circumferential extent of said re-entrant groove are such that the two grooves complement one another to form a bore which is an extension of the bore of said element.

The structure preferably also includes a further structural member having a longitudinally extending slot therein leading to a longitudinally extending cavity, the slot being bounded by two flanges and having a width greater than that of said collar but less than the maximum dimension of the head and said cavity being sufficiently large to receive said head, said head being within said cavity with the end portions of the cross-bar behind said flanges, and the collar being in said slot.

According to another aspect of the present invention there is provided a corner structure comprising a first member and a second member an end of which second member abuts a longitudinally extending face of said first member, each of said members having a longitudinally extending slot bounded by two flanges, first and second corner elements, each corner element having edges which intersect at the same angle as said members meet and each having grooves in one face thereof which grooves extend adjacent to said edges, the corner elements being located side-by-side in the angle enclosed by said member, and each having one of the flanges of one of said members entered in one of its grooves and one of the flanges of the other member entered in the other of its grooves, and a wedging element between said corner elements and forcing said corner elements away from one another and into engagement with said members.

The other face of each corner element may have a step therein thereby to provide a raised face portion and a lower face portion, there being an inclined ramp surface linking said face portions. In this constructional form, each ramp surface is preferably triangular in shape with a base edge merging with said lower face portion, and triangular flank surfaces extending along the other two edges of said ramp surface and merging both with said ramp surface and said raised face portion.

Figure 2:
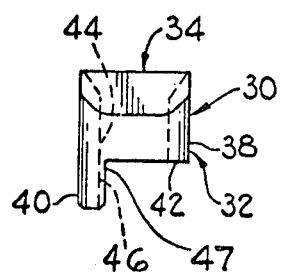
Figure 3:
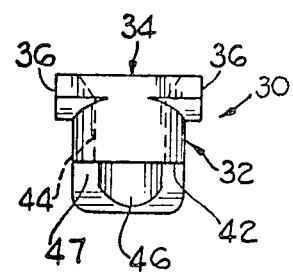
Figure 4:
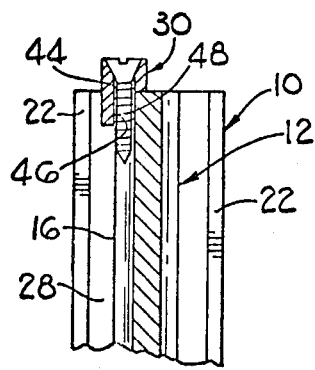
Figure 5:
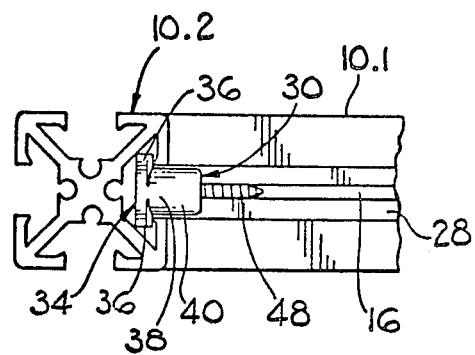
Figure 6:
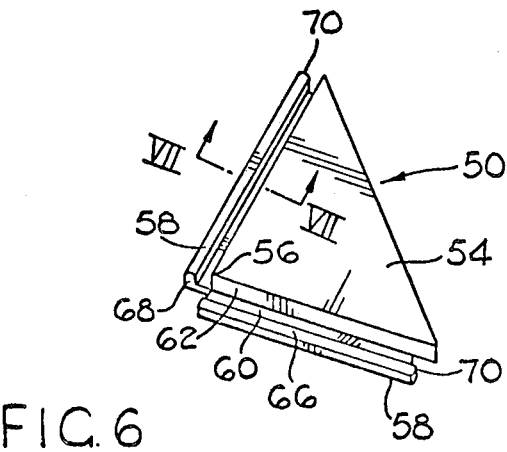
Figure 7:
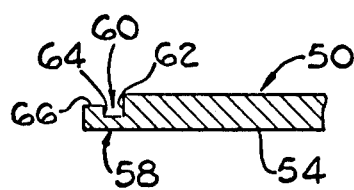
Figure 8:
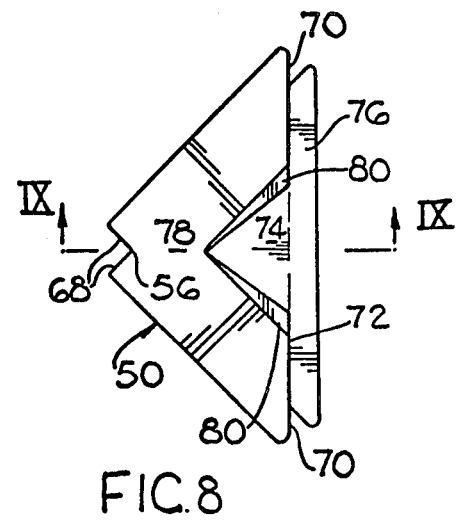
Figure 10:
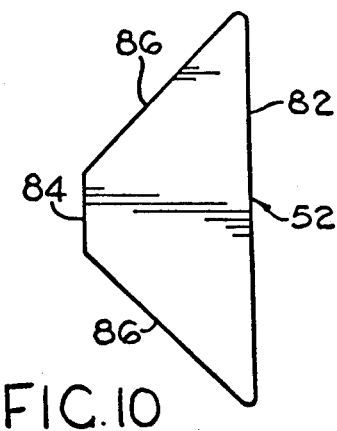
Figure 9:
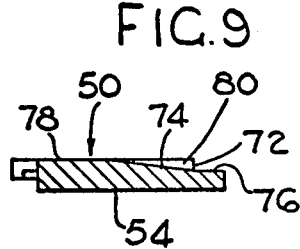
Figure 11:
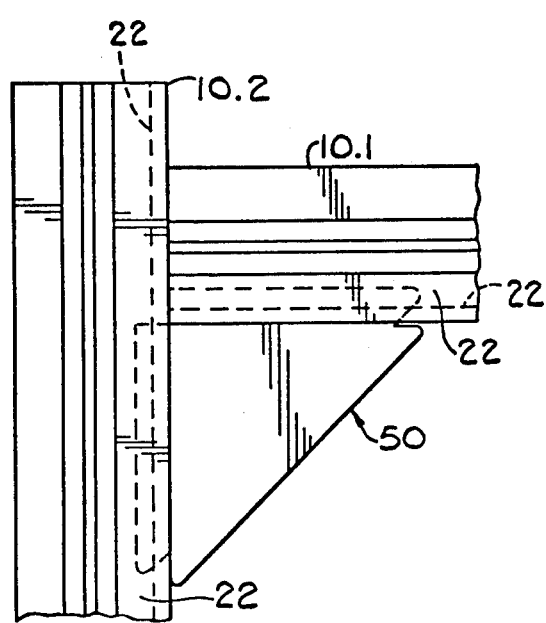
Figure 12:
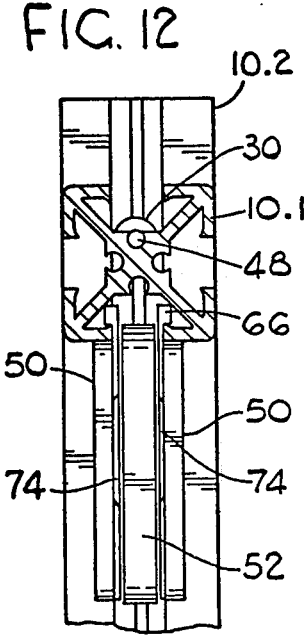

For a better understanding of the present invention, and to show how the same may be carried into effect, reference will now be made, by way of example, to the accompanying drawings in which:

FIG. 1 is a cross section through a structural member,

FIG. 2 is a side elevation, to a larger scale, of an element for joining two members of the form shown in FIG. 1, FIG. 3 is a front elevation of the element of FIG. 2, FIG. 4 shows the element of FIGS. 2 and 3 mounted on the member of FIG. 1, FIG. 5 is a plan view illustrating two members as shown in FIG. 1 joined by an element as shown in FIGS. 2 and 3, FIG. 6 is a pictorial view of one component of a corner structure, one face of the component being visible, FIG. 7 is a section of the line VII—VII of FIG. 6, FIG. 8 is a plan view of the other face of the component of FIG. 6, FIG. 9 is a section on the line IX—IX of FIG. 8, FIG. 10 is a plan view of a wedging element, FIG. 11 is a side elevation of a corner structure, and FIG. 12 is a front elevation of the corner structure of FIG. 11.

Referring firstly to FIG. 1, the structural member shown is generally referenced 10 and is an aluminium extrusion of indefinite length. The member comprises a central core 12 from which radiate four spokes 14. The core 12 is generally rectangular in cross section and the spokes 14 radiate from the corners thereof, there being a re-entrant groove 16 between each pair of adjacent spokes 14. Each groove 16 has a part-cylindrical surface 18 which subtends an angle of approximately 270° at the centre thereof.

Corner structures 20 are provided at the outer end of each spoke 14, each corner structure comprising two flanges 22 which are at right angles to one another. The longitudinally extending edges 24 of the flanges 22 define longitudinally extending slots 26 leading to longitudinally extending cavities 28.

The element 30 shown in FIGS. 2 and 3 is, in the front view shown in FIG. 3, of T-shape and comprises a collar 32 moulded integrally with a head 34. The head 34 includes two protrusions 36 which extend laterally of the collar 32 on opposite sides thereof and impart the T-shape configuration to the element. The collar 32 includes a cylindrical portion 38 adjacent the head 34 and a part cylindrical portion 40 which protrudes from the portion 38 on the side thereof remote from the head 34. This configuration gives rise to a flat, part annular, transversely extending end face 42 which extends parallel to the flat upper face of the head 34. A bore 44 passes through the head 34 and cylindrical portion 38. Where the bore 34 encounters the part cylindrical portion 40, it becomes a groove 46 of part circular configuration in the longitudinally extending face 47 of the portion 40. The faces 42 and 47 intersect at right angles.

The maximum width of the head 34, as seen in FIG. 3, is greater than the width of any one of the slots 26 but less than the maximum width of any one of the cavities 28. The minimum width of the head 34, as viewed in FIG. 2, is less than the width of any of the slots 26.

If reference is now made to FIG. 4, this FIG. shows an element 30 mounted on a structural member 10. The bore 44 of the element 30 is axially aligned with the re-entrant groove 16 so that the groove 46 and re-entrant groove 16 together define a bore which is an extension of the bore 44. A screw 48 is passed freely through the bore 44 (its head being received neatly in the counter bore provided in the head 34) and its shank is screwed into the re-entrant groove 16. The screw is preferably of the self tapping type and cuts a thread for itself in the bounding wall of the re-entrant groove 16. The face 42 abuts the end face of the core 12 and the part-cylindrical portion 40 is in the adjacent cavity 28.

FIG. 5 shows two structural members 10 joined by an element 30. The element 30 is secured to the horizontal structural member 10.1 and the head 34 is entered in one of the cavities 28 of the vertical structural member 10.2. It will be seen that the protrusions 36 of the head 34 lie behind the flanges 22 defining the slot 26 in which the cylindrical portion 38 of the collar 32 is received.

Two possible procedures are available for joining the structural members 10.1 and 10.2 by means of the element 30. Firstly, the member 10.1 may be presented to a side face of the member 10.2 with the maximum dimension of the head 34 aligned with the direction of elongation of the slot 26. The head 34 passes between the flanges 22 and the member 10.1 is then turned through 90° to bring the head to the position in which the protrusions 36 lie behind the flanges 22. Since the lower surfaces of protrusions 36 of head 34 are formed with curved cam surfaces (see FIG. 2), the end of member 10.1 will be drawn against the side of member 10.2 when the member 10.1 is turned to the position illustrated in FIG. 5. Alternatively, the element 30 may be presented to one end of the member 10.2 in the position in which the maximum dimension of the head 34 is parallel to the width of the slot 26. The member 10.1 can then be displaced longitudinally of the member 10.2 so that the head 34 enters the cavity 28. The member 10.1 is moved with respect to the member 10.2 until they reach the desired relative positions. The first procedure is the preferred mode of assembly.

Turning now to FIGS. 6 to 10, these Figures illustrate the components of a corner structure for bracing two structural members 10.1 and 10.2 which are linked together as shown in FIGS. 5, 11 and 12. FIGS. 6 to 9 illustrate an outer component 50 of the corner structure (two of these are employed) and FIG. 10 illustrates a wedge 52 one of which is used between the two components 50.

The component 50 comprises a main body 54 which is of triangular form with a right angled corner at 56. The sides of the main body 54 adjacent the corner 56 are extended by strip-like pieces 58 the cross-sectional shape of which is best seen in FIG. 7. It will be seen that each of these pieces includes a groove 60 one wall of which is constituted by the adjacent edge 62 of the main body 54 and the other wall of which is constituted by a vertical face 64 of an edge rib 66 of the piece 58. It will be noted that the height of the face 64 is less than that of the edge 62.

The extension pieces 58 have end faces 68 and 70. The two end faces 68, which are at right angles to one another, are aligned with the edges 62 of the main body 54. The end faces 70 are aligned with a step 72 (see FIGS. 8 and 9) provided in the other face of the component 50. Midway between the ends of the step 72 there is a ramp 74 which slopes upwardly from a strip-like surface 76 to the main face 78 of the component 50. The provision of the ramp 74 results in there being flank surfaces 80 of triangular form which join the main face 78 to the ramp 74.

The wedge 52 is of truncated triangular form having parallel long and short edges 82 and 84 and converging edges 86.

The corner structure is used to brace two structural members 10.1 and 10.2 which meet at right angles as best shown in FIG. 11. It can be assumed that the member 10.2 is a column and that the member 10.1 is a shelf support. The two components are held together by an element 30 which, while preventing them from being pulled apart, is not complete security against a load on the member 10.1 causing it to slide downwardly with respect to the member 10.2 or security against twisting of the member 10.1.

Two of the components 50 are placed in the angle between the members 10.1 and 10.2. The grooves 60 receive the flanges 22 and the ribs 66 engage behind the flanges. The shape of the component 50 at its corners prevents it fouling the flanges 22. In this position, there is a gap between the components 50 and the ramps 74 are aligned with one another. The short edge 84 of the wedge 52 is pushed between the components 50, the ramps 74 and flanks 80 being engaged by the wedge as it enters the gap between the components 50. As the wedge is pushed in, the components 50 are urged apart so that their ribs 66 are firmly interlocked with the flanges 22. In this condition, as will be seen in FIG. 12, the wedge 52 is sandwiched by the components 50 and the frictional engagement between the various components prevents downward movement of the member 10.1 with respect to the member 10.2.

The element 30, the components 50 and the wedge 52 may all be mouldings of synthetic plastics material.

I claim:

1. An element for releasably fastening two members together, the element being T-shaped and comprising a head constituting the cross-bar of the "T" and a collar forming the upright of the "T", there being a bore passing through the collar and the head, and the collar comprising a cylindrical portion adjacent to and merging with the head and means for engaging a member to prevent rotation between the element and member when engaged, said means including a further portion protruding from the cylindrical portion on the side thereof remote from the head and in a direction parallel to the longitudinal axis of said bore, the further portion having a longitudinally extending face which intersects a transversely extending end face of said cylindrical portion.

2. An element as claimed in claim 1, wherein said faces intersect at right angles to one another.

3. An element as claimed in claim 1, wherein said longitudinally extending face lies in a plane parallel to the direction in which the head is elongated.

4. An element as claimed in claim 1, wherein said bore is cylindrical where it passes through the head and cylindrical portion of the collar, said further portion having a part cylindrical groove in said longitudinally extending face thereof which groove forms a continuation of the cylindrical face of the bore in said cylindrical portion.

5. An element according to claim 4 in combination with a structure comprising a screw, and a structural member having a longitudinal face with a longitudinally extending reentrant groove therein and a transverse face intersecting said longitudinal face, said element being positioned with its transversely extending face in engagement with the transverse face of said member, its longitudinally extending face in engagement with the longitudinal face of said member and the axis of its bore aligned with the longitudinal axis of said reentrant groove, said screw passing through said head and said cylindrical portion and into said reentrant groove to secure said element to said member.

6. An element and structure according to claim 5 wherein the circumferential extent of said part cylindrical groove in said further portion and the circumferential extent of said reentrant groove are such that the two grooves complement one another to form a bore which is an extension of the bore of said element.

7. An element and structure according to claim 6, and including a further structural member having a longitudinally extending slot therein leading to a longitudinally extending cavity, the slot being bounded by two flanges and having a width greater than that of said collar but less than the maximum dimension of the head and said cavity being sufficiently large to receive said head, said head being within said cavity with the end portions of the cross-bar behind said flanges, and the collar being in said slot.

8. An element according to claim 1, wherein said head comprises cam means for drawing two members together when the element is fixed to one member and rotated relative to the other member.

* * * * *